Patented Nov. 15, 1949

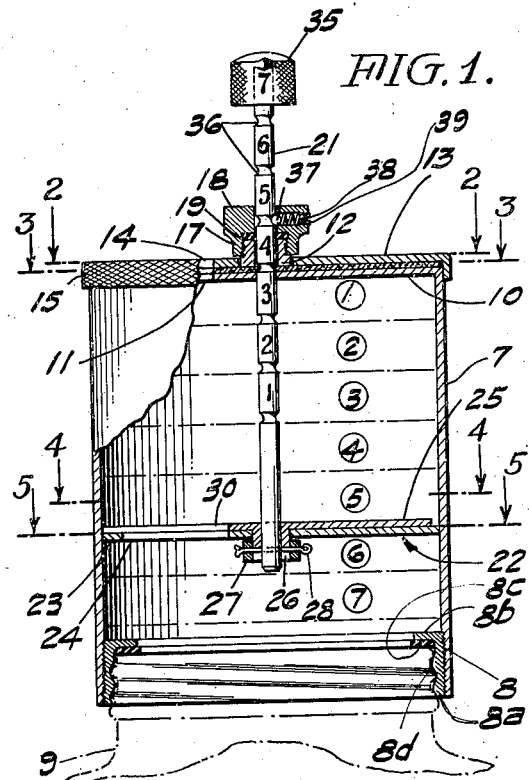
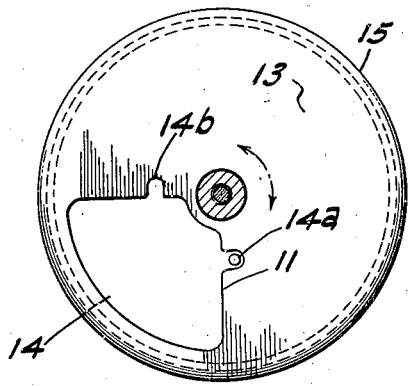
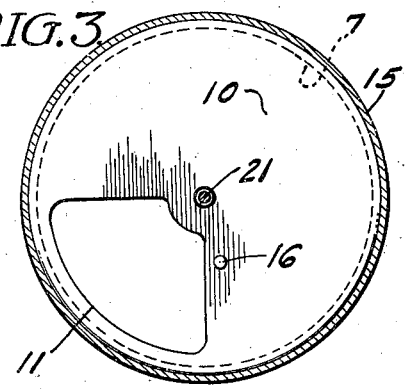
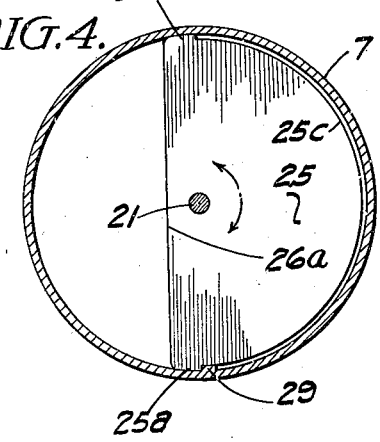
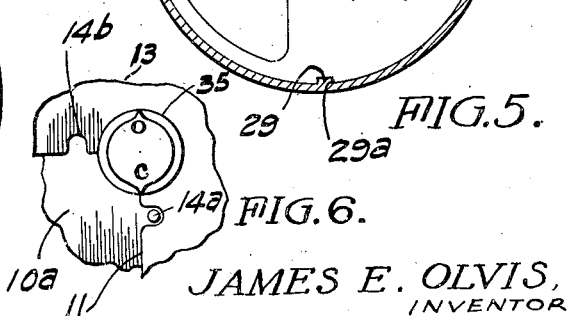

2,487,825

UNITED STATES PATENT OFFICE 2,487,825

MEASURING ATTACHMENT FOR CONTAINERS

James E. Olvis, Glendale, Calif.

Application June 24, 1946, Serial No. 678,976

2 Claims. (Cl. 222—439)

This invention relates to a measuring attachment for containers.

More specifically speaking, the invention pertains to a casing member one end portion of which is attachable to the mouth portion of a conventional container, such as a coffee jar, said casing having within it a measuring chamber which may be manually adjusted as to its size, which chamber can be filled by holding the container in a pouring position, and then the measured quantity contained within said chamber can be poured from the attached container.

The invention may also be defined as a new article of manufacture consisting of a quantity measuring device having a screwthreaded intake portion attachable to containers now on the market.

It is an object of this invention to improve upon prior devices of the same class by furnishing a more simple and satisfactory means for opening and closing the intake and delivery apertures of a measuring chamber.

Also, a more specific object is to provide a measuring device having an adjustable, piston-like metering element wherein the head portion of the piston is constructed in an improved manner.

Other objects, advantages and features of invention will hereinafter appear.

Referring to the accompanying drawing, which illustrates a preferred embodiment of the invention, Fig. 1 is a vertical midsection of the complete device, except that a fragment of the casing is shown in side elevation. In this view a fragment of the supply container is outlined in broken lines, showing its relation to the attached measuring device.

Figs. 2, 3, 4 and 5 are horizontal sections taken respectively on lines 2—2, 3—3, 4—4 and 5—5 of Fig. 1.

Fig. 6 is a fragmentary plan view.

Referring in detail to the drawing, the cylindrical casing 7 has an open end with an interiorly screwthreaded portion 8 into which is screwed an annular coupling member 8a having within its upper end an annular flange 8b and gasket 8c. Said coupling member has a large internal set of threads 8d for screwing onto the mouth portion of a supply receptacle 9, for example, a coffee jar or the like. Opposite to its screwthreaded end said casing 7 has an end wall 10 which is provided with a large, somewhat triangularly shaped pouring aperture 11, this aperture being eccentrically positioned in said wall so as to leave the central portion thereof intact.

In its central portion the wall 10 is apertured and provided with an outwardly directed, annular central rise 12. Said rise 12 affords a central bearing for a turnable cap plate 13 which has through it a dispensing aperture 14 movable into and out of register with the already mentioned aperture 11 in the wall 10. Said cap plate 13 is provided with a downwardly directed, peripheral milled flange 15, which may be conveniently grasped by the operator to turn the cap plate to the desired position. A stop pin 16 upstands from the wall 10 and cooperates with recesses 14a and 14b in the edge portions of the aperture 14 so as to arrest the turning movements of the cap plate when moved from fully opened to fully closed position, and vice versa.

The outer part of the annular rise 12 is diametrically reduced and screwthreaded as indicated at 17, and has screwed upon it an apertured nut 18, an elastic gasket 19 being placed between the nut and the upper end and the rise 12, so that when the nut is firmly screwed down said gasket will have a nut locking effect. Also, there is provided a gasket 10a between the wall 10 and the cap plate 13 better to seal-in the contents of the jar 9.

Through both the rise 12 and the nut 18 slidably and turnably extends a rod 21, the inner end of which carries a piston-head-like structure 22. This piston head structure comprises a lower disk 23 having a cut-out portion thereby providing through it an intake aperture 24, and an upper disk 25, having a downwardly extending hub portion 26 through which the lower part of the rod 21 extends. A collar 27 is shown surrounding said hub below the two disks, and a cotter pin 28 extends through the rod, hub and collar to keep the latter in place as well as to fix the upper disk to the rod. The upper disk 25 is deeply cut-away along one side to a straight edge 26a spaced somewhat away from its center thereby, in effect, providing a large aperture through it. The curved edge of said disk 25 extends through somewhat more than a semi-circumference and the diameter of the disk is slightly less than that of the interior of the casing 7, except adjacent to the ends of the stright side 26a where it has ears 25a and 25b which slidably fit within said casing. By thus shaping and dimensioning said disk 25 a semi-circular clearance 25c is provided between the disk and casing, and said clearance accommodates a stop rib or spline 29 of the casing which cooperates with said ears properly to limit the turning movements of said disk. The spline 29, which acts as a stop for the turning movements of disk 25, serves as a guide for the sliding movements of disk 23 which has a peripheral notch 29a to receive said spline, said disk 23 being held against turning by said spline and having its periphery in a close-fitting, slidable relation to the casing 7.

Returning to the rod 21 of the piston-like structure, said rod carries at its upper end a milled operating knob 35 which enables the operator to conveniently turn and slide said rod. This rod has a series of spaced apart grooves 36 around it, thereby dividing it into equal sections from above downwardly, seven of such sections being shown in the drawing, each of these sections being labeled with a numeral, commencing below with the numeral "1" and ending above with the numeral "7," the latter numeral being inscribed upon the surface of the knob 35. In order to center the rod 35 in any one of the seven longitudinal positions which it is adapted to assume, a centering device is provided within the annular nut 18, said device comprising a centering ball 37 of the right size to conform to the curvatures of the grooves 36, this ball being pressed toward the rod, and between the paired shoulders afforded by each of said grooves, by means of a spiral spring 38 held in place within a bore in the nut by means of a short screw 39.

Preparatory to putting the device into use its coupling member 8a, while remaining attached to the casing 7, will be screwed onto the top of the supply container 9 after the conventional closure cap thereof (not shown) has been removed. The screwing on will be completely performed so as to compress the gasket 8c between the mouth edge of the container 9 and the coupler flange 8b. Thereupon the measuring rod 21 will be slidably adjusted so to position the piston head 22 that the chamber between it and the casing end wall 10 will contain the desired amount of granular material to be measured out at a single metering operation. The device as shown in Fig. 1 may be regarded as a coffee dispenser set to dispense the amount of ground coffee required to make 5 cups of that beverage, this amount being indicated by the numeral "5" appearing just above the nut 18 and the spring-pressed ball 37 releasably holding said rod in said adjusted position. Next, the user will see to it that the apertured cap 13 having the milled flange 15 is turned to position its aperture 14 out of register with the aperture 11 in the top wall 10 of the casing. Thereupon he will turn the knob 35 anticlockwise until its rotation, together with the rod 22 and plate 25 fixed thereto is stopped by reason of the ear 25a engaging the spline 29 (see Fig. 4), at which time the intake opening 24 of the lower plate 23 of the piston head will be fully open. Then the operator will turn the jar 9 and attached casing 7 to an inverted position so that the measuring chamber of the latter will be completely filled with coffee flowing thereinto from the jar. Next the operator will, by rotating the knob 35 in the reverse direction to its previous operation, close the aforesaid plate opening 24, whereupon he will restore the jar to its upright position. Finally he will turn the milled cap 13 to the position for unobstructing the aperture 11 in the top wall of the container, whereupon the jar and attached container will again be canted sufficiently near to an inverted position to deliver the measured coffee to the coffee pot or other utensil into which it is desired to deposit it. The aforesaid turning of the plate 25 (which is of less diameter than the overlapping plate 23) to its closed position while the device is in an inverted position, is accomplished without any of the granular contents of the device creeping in between the two plates, which undesirable occurrence might take place if, at such time, the plate to be turned were uppermost. In dispensing hard granules, like those of coffee, the wedging in of the granules between relatively turnable parts, is particularly obstructive.

I claim:

1. In a measuring attachment for containers, a tubular casing having an end wall with a delivery aperture through it eccentric to the axis of said casing, a cap plate turnably mounted on said end wall in an overlying relation thereto, said cap plate having an aperture through it which is movable into and out of register with said delivery aperture when said cap plate is turned, said end wall having an outwardly directed central annular rise and said cap plate having a centrally apertured portion fitted loosely around the inner end portion of said rise, a centrally apertured nut screwed onto said rise and keeping said cap plate in place upon the aforesaid casing, a piston-like member having its head within said casing and its rod extending turnably and slidably through both said annular rise and said apertured nut, manually graspable means carried by said rod to facilitate its manual turning and sliding, means operating between said rod and an adjacent part of the device yieldingly to maintain said rod and the aforesaid head carried thereby in various longitudinal positions in respect to the axis of said casing thus varying the size of the chamber within the casing between said end wall and piston head, a spline carried internally by said tubular casing, said head of the piston-like structure comprising two flatwise adjacent plates one of which is maintained by said spline in a splined relation to said casing allowing it to move longitudinally within the casing while in a non-turnable relation thereto, the other of said plates of the head being secured to the piston rod so as both to turn therewith and to be thereby adjusted longitudinally of said casing, each of said plates of said head having a cut-out portion, the plate of said piston-like structure which is turnable being peripherally recessed, thus providing a semi-circular clearance between its periphery and the casing which unobstructs turning of the plate in relation to said spline to bring the plate's cut-out into and out of register with the cut-out in the other plate of the head of the piston-like structure, said plate with the semi-circular peripheral recess being provided with an ear at each end of said recess which cooperates with the aforesaid spline to limit the turning movement of the latter plate in opposite direction by said manually graspable means, and means to attach to a supply container to receive a supply of granular material therefrom that end portion of said casing which is opposite to its aforesaid end wall and cap plate.

2. In a measuring attachment for containers, a tubular casing having an end wall with a delivery aperture through it eccentric to the axis of said casing, a cap plate turnably mounted on said end wall in an overlying relation thereto, said cap plate having an aperture through it which is movable into and out of register with said delivery aperture when said cap plate is turned, a piston-like member having its head within said casing and its rod extending turnably and slidably through said end wall, means cooperating between said rod and an adjacent part of the device yieldingly to maintain said rod and the aforesaid head carried thereby in various longitudinal positions in relation to the axis of said casing, thus varying the size of the chamber between said end wall and piston head, said head of the piston-like member comprising two flatwise contacting plates one of which is splined in a non-turnable, close-fitting relation to the casing during longitudinal adjustment of said piston-like member, each of said plates of said head having a cut-out portion, the plate of the head of the piston-like member which cooperates with said splined plate having a peripheral recess thus providing between its periphery and the casing an elongated semi-circular clearance so that said recessed plate can be turned by said rod to bring its cut-out into and out of register with the cut-out of the other plate of the piston-like member, the ends of said recess forming stops which arrest the turning movements of the recessed plate with its said cut-out into or out of register with the cut-out of the other plate, and means to attach to a supply container to receive a supply of granular material therefrom that end portion of said casing which is opposite to its aforesaid end wall and cap plate.

JAMES E. OLVIS.

REFERENCES CITED

The following references are of record in the file of this patent:

UNITED STATES PATENTS

| Number | Name | Date |
| --- | --- | --- |
| 1,684,313 | Graham | Sept. 11, 1928 |
| 1,972,152 | Lopez | Sept. 4, 1934 |
| 2,096,461 | Mane et al. | Oct. 19, 1937 |
| 2,372,278 | Jess | Mar. 27, 1945 |